(12) United States Patent
Ahn (10) Patent No.: US 9,645,658 B2
(45) Date of Patent: May 9, 2017

(54) LOCAL KEY MODULE AND DISPLAY DEVICE INCLUDING THE SAME

(71) Applicant: LG ELECTRONICS INC., Seoul (KR)

(72) Inventor: Daeseon Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 14/592,122

(22) Filed: Jan. 8, 2015

(65) Prior Publication Data

US 2015/0205380 A1    Jul. 23, 2015

(30) Foreign Application Priority Data

Jan. 20, 2014  (KR) ........................ 10-2014-0006538

(51) Int. Cl.
| | |
|---|---|
| *G06F 3/033* | (2013.01) |
| *G06F 3/0362* | (2013.01) |
| *H01H 19/11* | (2006.01) |
| *H01H 25/04* | (2006.01) |
| *G06F 3/0338* | (2013.01) |

(52) U.S. Cl.
CPC .......... *G06F 3/0362* (2013.01); *H01H 19/11* (2013.01); *H01H 25/041* (2013.01); *G06F 3/0338* (2013.01); *H01H 2025/048* (2013.01)

(58) Field of Classification Search
CPC ..... G06F 3/0362; G06F 3/0338; H01H 19/11; H01H 25/041; H01H 2025/048
See application file for complete search history.

(56) References Cited

U.S. PATENT DOCUMENTS

| | | | |
|---|---|---|---|
| 7,733,328 B2* | 6/2010 | Blandin | G06F 3/0362 345/156 |
| 2003/0076292 A1 | 4/2003 | Griffin et al. | |
| 2004/0170270 A1* | 9/2004 | Takashima | G01D 5/145 379/363 |
| 2006/0164403 A1 | 7/2006 | Volckers | |
| 2007/0235294 A1* | 10/2007 | Kang | G06F 3/0362 200/4 |
| 2007/0247421 A1 | 10/2007 | Orsley et al. | |
| 2009/0058802 A1 | 3/2009 | Orsley | |
| 2010/0073291 A1* | 3/2010 | Hisatsugu | G06F 3/0338 345/161 |
| 2010/0259481 A1* | 10/2010 | Oh | G06F 3/03548 345/163 |

(Continued)

OTHER PUBLICATIONS

European Search Report dated Jun. 1, 2015 issued in Application No. 15150935.3.

*Primary Examiner* — Andrew Sasinowski
*Assistant Examiner* — Gerald Oliver
(74) *Attorney, Agent, or Firm* — KED & Associates LLP (57) ABSTRACT

A local key module and a display device including the same are disclosed herein. The local key module includes the local key module includes a wheel key configured to be rotatable, the wheel key having a circular shape aligned on a first plane, a rotation detection unit configured to detect a rotating movement of the wheel key, and a circuit board configured to supply electric current to the rotation detection unit, the circuit board being aligned on a second plane, wherein the second plane is parallel is the first plane.

17 Claims, 8 Drawing Sheets

(56) References Cited

U.S. PATENT DOCUMENTS

2011/0037696 A1\* 2/2011 Tang ............... G06F 3/0338
    345/163
2013/0215031 A1\* 8/2013 Peng ............... G06F 3/0338
    345/163

\* cited by examiner

| User Input inputted through Local Key Module | Function of Display Device |
|---|---|
| Clockwise / Counter-clockwise rotation input of wheel key | Volume Up/Down, Left/Right menu Shift |
| First switch input | Menu Selection, Power On/Off |
| Second switch input | Channel down |
| Third switch input | Channel up |

LOCAL KEY MODULE AND DISPLAY DEVICE INCLUDING THE SAME

CROSS-REFERENCE TO RELATED APPLICATION

Pursuant to 35 U.S.C. §119(a), this application claims the benefit of the Korean Patent Application No. 10-2014-0006538, filed on Jan. 20, 2014, which is hereby incorporated by reference as if fully set forth herein.

BACKGROUND OF THE INVENTION

1. Field of the Invention

The present invention relates to a local key module and a display device including the same and, more particularly, to a structure of a local key module that can contribute to reducing a thickness of a display device.

2. Discussion of the Related Art

The above references are incorporated by reference herein where appropriate for appropriate teachings of additional or alternative details, features and/or technical background.

In case of a display device, such as a television receiver (TV) or a monitor, diverse user commands may be received from a wireless remote controller. However, in most cases, in order to ensure user convenience with respect to basic functions (e.g., power on/off, channel switching (or changing), volume up/down, and so on), local key buttons are provided on an outside surface of a housing of the display device.

Recently, since the exposure of multiple local key buttons respective to each function is considered to degrade the appearance of the display device, a local key module, which is configured to manage multiple functions by using a single local key, has been developed. Such local key module is configured to expose only a portion of a button unit to the outside of the display device and to have the remaining portion of the local key module aligned and positioned inside the housing of the display device.

However, even in case of using the local key module, which is configured to manage multiple functions by using a single local key, during a process of equipping the local key module inside of the display device, there still lies a problem in that an overall thickness of the display device increases due to the thickness of the local key module itself.

SUMMARY OF THE INVENTION

Accordingly, the present invention is directed to a local key module and a display device including the same that substantially obviate one or more problems due to limitations and disadvantages of the related art.

A technical object that is to be achieved by an exemplary embodiment of the present invention is to propose a structure of a local key module that can contribute to reducing the thickness of the display device by reducing the thickness of the local key module itself.

A technical object that is to be achieved by another exemplary embodiment of the present invention is to provide a solution allowing the user to intuitively control the functions of the display device by using the local key module.

The technical objects of the present invention will not be limited only to the objects described above. Accordingly, technical objects that have not been mentioned above or additional technical objects of the present application may become apparent to those having ordinary skill in the art from the description presented below.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, as a local key module being included in a display device, the local key module includes a wheel key configured to be rotatable, the wheel key having a circular shape aligned on a first plane, a rotation detection unit configured to detect a rotating movement of the wheel key, and a circuit board configured to supply electric current to the rotation detection unit, the circuit board being aligned on a second plane, wherein the second plane is parallel is the first plane.

In another aspect of the present invention, a display device includes a display panel having a first face to define a first plane, a housing provided at a side surface of the display panel and a rear surface of the display panel side surfaces and a rear surface of the display panel, and a local key module provided at a lower portion within the housing, wherein the local key module includes a wheel key configured to rotate, a rotation detection unit configured to detect a rotating movement of the wheel key, and a circuit board configured to supply electric current to the rotation detection unit, wherein the wheel key to define a second plane, and the circuit board to define a third plane, and wherein the second plane is parallel to the first plane, and the third plane is parallel to the first plane.

In yet another aspect of the present invention, a display device includes a display unit, a local key module that includes a wheel key configured to be rotatable, a rotation detection unit configured to detect a rotating movement of the wheel key, and a circuit board configured to supply electric current to the rotation detection unit, and a controller configured to execute a predetermined function in accordance with a first signal based on the rotating movement of the wheel key detected by the rotation detection unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a mobile user equipment related to the present invention will be described in detail with reference to the accompanying drawings. Additionally, the suffixes "module" and "unit" that are mentioned in the elements used in the present description are merely used individually or in combination for the purpose of simplifying the description of the present invention. Therefore, the suffix itself will not be used to differentiate the significance or function or the corresponding term.

Figure 1:
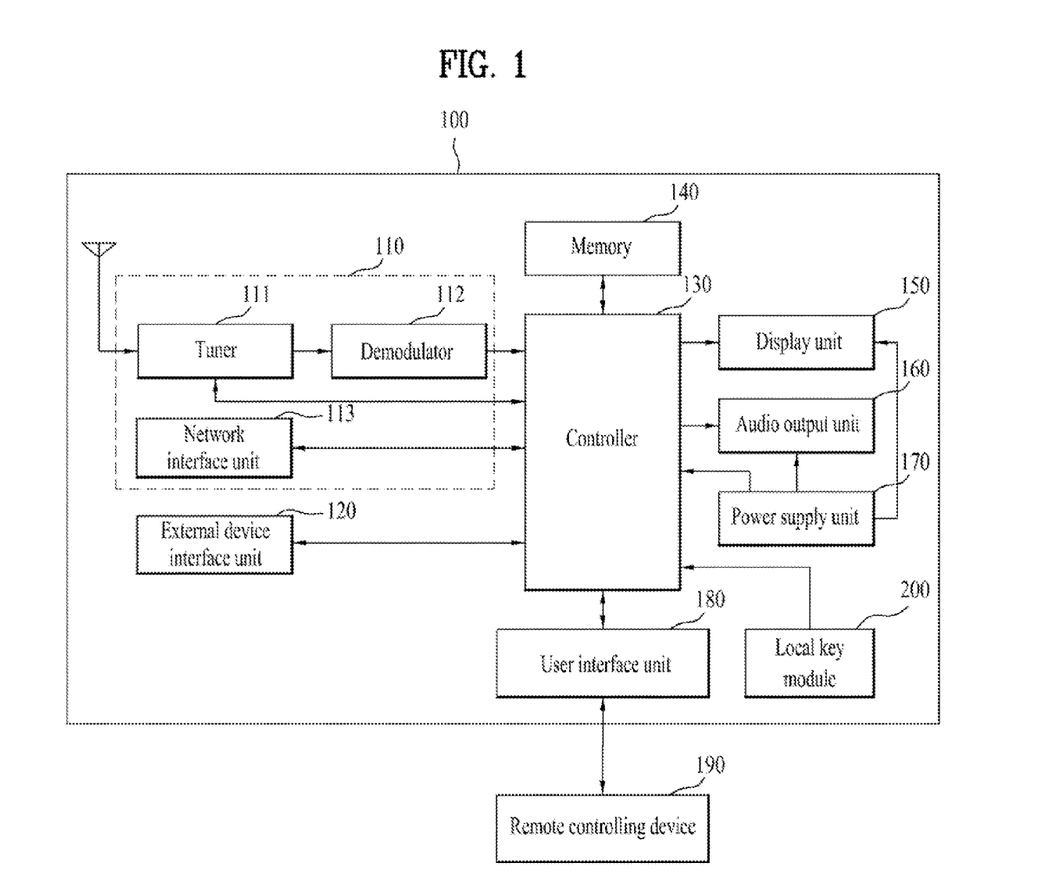
FIG. 1 illustrates a block view for describing configuration modules of a display device according to an exemplary embodiment of the present invention.

FIG. 1 illustrates a block view for describing configuration modules of a display device according to an exemplary embodiment of the present invention. However, FIG. 1 corresponds to an example being provided for convenience in the description of the present invention, and, therefore, a structure of having additional configuration modules other than the configuration modules shown in FIG. 1 added to the display device or having some of the configuration modules omitted from the display device may also be included in the scope of the present invention.

In FIG. 1, although the display device 100 will be described under an assumption that the display device 100 corresponds to a television receiver (TV) equipped with internet functions, the present invention will not be limited only to this. Accordingly, analog TVs being dedicated to initial (or fundamental) functions of a television receiver without being equipped with the internet function, digital TVs, or monitors may correspond to the display device of the present invention.

As shown in FIG. 1, the display device 100 according to the present invention may be configured to include a receiving unit 110, an external device interface unit 120, a controller 130, a memory 140, a display unit 150, an audio output unit 160, a power supply unit 170, a user interface unit 180, and a local key module 200.

The receiving unit 110 may include a tuner 111, a demodulator 112, and a network interface unit 113. In some cases, a plurality of tuners 111 may be included.

For example, the tuner 111 may receive an RF broadcast signal of a single carrier respective to an Advanced Television System Committee (ATSC) method, or the tuner 111 may receive an RF broadcast signal of a multi-carrier respective to a Digital Video Broadcasting (DVB) method.

The demodulator 112 receives a digital intermediate frequency (IF) signal (DIF signal), which is converted in the tuner 111, and then performs demodulation operations.

For example, in case the digital IF signal being outputted from the tuner 111 corresponds to the ATSC method, the demodulator 112 may perform 8-Vestigal Side Band (8-VSB) demodulation. Additionally, the demodulator 112 may also perform channel decoding.

The network interface unit 113 provides an interface configured to connect the display device 100 to a wireless and/or wired network including the Internet. In order to establish access to a wired network, the network interface unit 113 may, for example, be equipped with an Ethernet terminal, and so on, and, in order to establish access to a wireless network, for example, diverse communication standards, such as Wireless LAN (WLAN (or Wi-Fi)), Wireless broadband (Wibro), World Interoperability Microwave Access (Wimax), High Speed Downlink Packet Access (HSDPA), and so on, may be used.

The network interface unit 113 may transmit or receive data to or from another user or another electronic device through the accessed network or through another network being linked to the accessed network.

The external device interface unit 120 corresponds to an interface configured to enable data communication to be performed between an external device and the display device 100. The external device interface unit 120 may be connected to an external device, such as a Digital Versatile Disc (DVD) player, a Bluray player, a gaming device, a camera, a camcorder, a computer (or notebook (or laptop) computer), an STB, and so on, via wired and/or wireless connection. The external device interface unit 120 delivers (or transports) video, audio, or data signals being inputted from an external source to the controller 130. Additionally, the external device interface unit 120 may also output the video, audio, or data signals, which are processed by the controller 130, to the external device.

For example, the external device interface unit 120 may include a Universal Serial Bus (USB) terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on. HDMI corresponds to an interface configured to simultaneously deliver (or transport) digital type video and audio signals to a single cable. And, in case both a reproduction device and an output device are equipped with a HDMI terminal, video signals and audio signals may be conveniently transmitted and received by connecting only one HDMI cable between the reproduction device and the output device.

The memory 140 may store programs for processing signals within the controller 130 and for controlling the controller 130, and the memory 140 may also store signal-processed video, audio or data signals. Additionally, the memory 140 may also perform a function of temporarily storing video, audio or data signals being inputted from the external device interface unit 120 or from the network interface unit 113. Furthermore, for example, the memory 140 may also store diverse types of operation systems (OSs), middleware, and platforms.

The user interface unit 180 either delivers a signal inputted by the user to the controller 130, or the user interface unit 180 transmits the signal received from the controller 130 to an external device (e.g., a remote controlling device (or remote controller) 190). For example, in accordance with diverse communication methods, such as a Radio Frequency (RF) communication method, an Infrared (IR) communication method, and so on, the user interface unit 180 is designed to receive control signals corresponding to power on/off, channel selection, screen set-up, and so on, from the remote controller 190 and to process the received control signals, or the user interface unit 180 is designed to transmit control signals received from the controller 130 to the remote controller 190.

The controller 130 controls each configuration module within the display device 100.

The controller 130 may demultiplex a stream being inputted through the tuner 111, the demodulator 112, the network interface unit 113, or the external device interface unit 120, or the controller 130 may process the demultiplexed signals, so as to create and output signals for video or audio output.

The display unit 150 converts each of the video signal, data signal, OSD signal, and so on, which are processed by the controller 130, or converts each of the video signal, data signal, and so on, which are received from the external device interface unit 120, to R, G, B signals, so as to generate a Drive signal. The display unit 150 may correspond to any one of a PDP, a LCD, an OLED, a flexible display, a 3-dimensional (3D) display, and so on. In the aspect of a physical component, the display unit 150 may also be referred to as a display panel.

The audio output unit 160 receives an audio-processed signal, which is processed by the controller 130, e.g., a stereo signal, a 3.1 channel signal, or a 5.1 channel signal, and outputs the received signal as sound. Herein, the audio output unit 160 may be implemented as diverse forms of speakers.

Additionally, the power supply unit 170 supplies the corresponding power throughout the entire display device 100. Most particularly, the power supply unit 170 may supply power to the controller 130, which may be implemented in the form of a System On Chip (SOC), and the power supply unit 170 may also supply power to the display unit 150 for displaying images and to the audio output unit 160 for outputting audio (or sound). And, the power supply unit 170 may also supply power to the local key module 200.

The local key module 200 receives a user input respective to a predetermined function of the display device 100. The local key module 200 may be positioned on a lower portion of the display unit 150. A portion of the local key module 200 may be exposed to the outside of a housing (not shown) of the display device 100, and the local key module 200 may receive user inputs respective to some of the functions of the display device 100 (e.g., power on/off, channel switching (or changing), volume up/down, and so on). The controller 130 detects a signal corresponding to a user input, which is received through the local key module 200. This will hereinafter be described in more detail with reference to each of the accompanying drawings.

Figure 2:
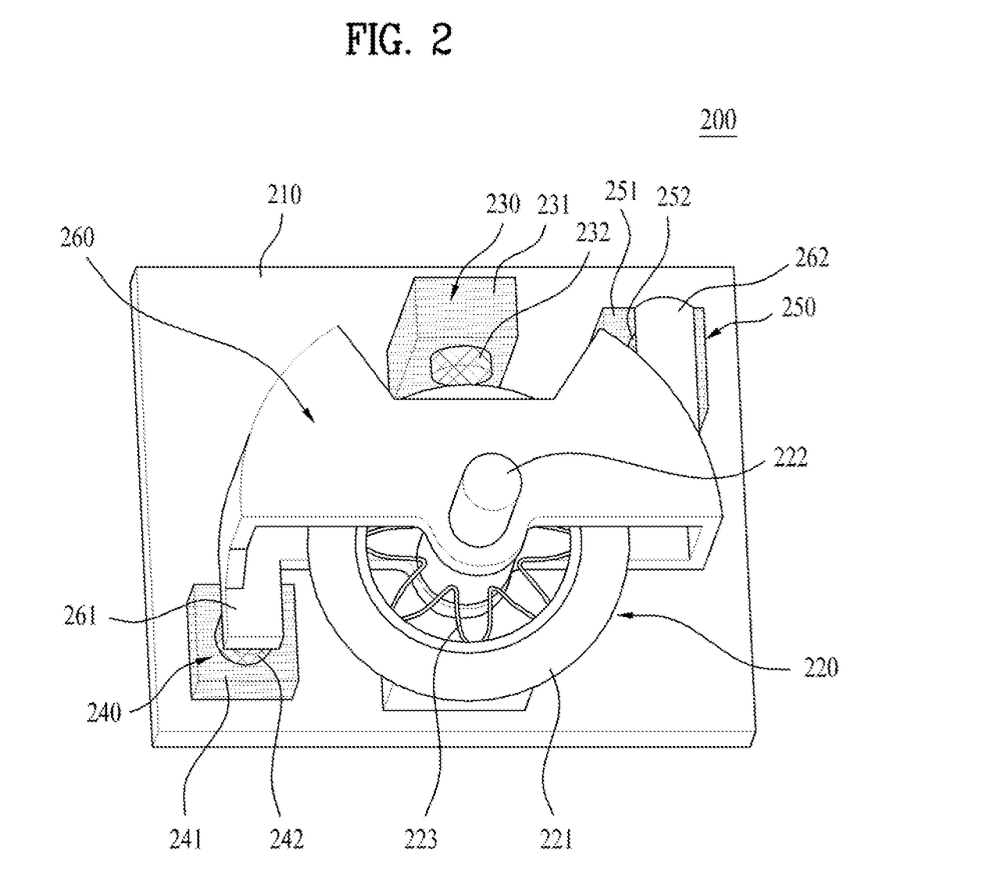
FIG. 2 illustrates a perspective view of a local key module according to an exemplary embodiment of the present invention.
Figure 3:
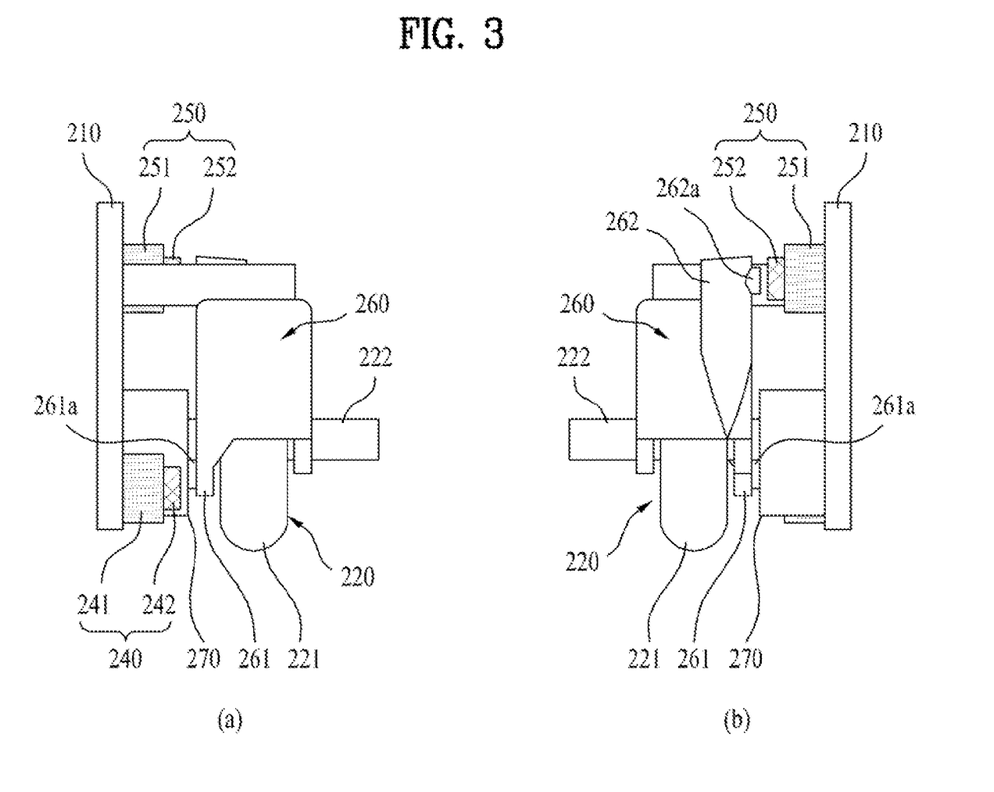
FIG. 3 illustrates a left side view and a right side view of a local key module according to an exemplary embodiment of the present invention.

FIG. 2 illustrates a perspective view of a local key module according to an exemplary embodiment of the present invention. And, FIG. 3 illustrates a left side view and a right side view of a local key module according to an exemplary embodiment of the present invention. The structure of the local key module according to the exemplary embodiment of the present invention will hereinafter be described in detail with reference to FIG. 2 and FIG. 3.

Referring to FIG. 2 and FIG. 3, a wheel key 220 configured to be capable of rotating clockwise/counter-clockwise, a rotation detection unit (or a rotation detector) 270 configured to detect rotating movements of the wheel key 220, and a circuit board 210 configured to supply electric currents to the rotation detection unit 270.

The wheel key 220 has a circular shape and is aligned on a first plane. The wheel key 220 may be configured to include a ring unit 221 shaped in a doughnut form having its center portion open, a rotation axis 222 corresponding to a rotation center point (or pivoting point) of the wheel key 220, and a spring unit 223 configured to be positioned between the ring unit 221 and the rotation axis 222. Herein, due to the spring unit 223, the ring unit 221 may be capable of stably maintaining its ring form while maintaining tension.

Since the ring unit 221 corresponds to a part being touched (or contacted) by the user's finger, as described below, the ring unit 221 may be configured to include a rubber material, so as to prevent the user's finger from slipping while the user can feel softness of the ring unit 221.

The rotation detection unit 270 detects rotating movements of the wheel key 220. More specifically, the rotation detection unit 270 may detect whether or not the wheel key 220 is being rotated, a rotating direction of the wheel key 220, and a rotation degree of the wheel key 220.

When the rotation detection unit 270 detects a rotating movement of the wheel key 220, the rotation detection unit 270 transmits a signal corresponding to at least one of whether or not the wheel key 220 is being rotated, a rotating direction of the wheel key 220, and a rotation degree of the wheel key 220 to the circuit board 210. Thereafter, the circuit board 210 may output the signal to the controller 130.

The controller 130 detects a signal corresponding to the rotating movement of the wheel key 220, which is inputted through the local key module 200, and, then, the controller 130 may execute the function of the display device 100, which is mapped to the detected signal.

The rotation detection unit 270 is positioned within the circuit board 210, and, in some cases, the rotation detection unit 270 may be positioned, so as to be connected to (or couple to) the rotation axis 222 of the wheel key 220.

The circuit board 210 supplies electric currents that are required for driving the rotation detection unit 270. The circuit board 210 is aligned on a second place which is parallel to the first plane.

For example, the circuit board 210 may correspond to a printed circuit board (PCB) or a flexible board (or substrate), and the circuit board 210 may have a circuit pattern formed of one of its surfaces.

The circuit board 210 and the wheel key 220 may be positioned along the same direction. In other words, the circuit board 210 and the wheel key 220 may be positioned along a horizontal direction. More specifically, the circuit board 210 may be positioned to be perpendicular to the rotation axis 222 of the wheel key 220 and may be positioned to be parallel to the ring unit 221 of the wheel key 220.

According to the exemplary embodiment, the local key module 200 may further include a first switch 230.

The first switch 230 is positioned on the circuit board 210 and one surface of the first switch 230 may be in contact with the circuit board 210. For example, the first switch 230 can be electrically connected to the circuit board 210. The first switch 230 may be positioned on an upper portion of the wheel key 220.

The first switch 230 may be configured to include a body 231, which comes in contact with (or connected to) the circuit board 210, and a button unit 232, which is positioned on one surface of the body 231.

For example, the first switch 230 may correspond to a tact switch, which is configured to have the button unit 232 protrude from one surface of the body 231. Herein, a tact switch refers to a switch that is in an On state, when a contact point is pressed by the user, and that is in an Off state, when the user releases his (or her) finger from the contact point. Herein, since this type of switch is well-known to anyone skilled in the art, a detailed description of the same will be omitted for simplicity.

The circuit board 210 supplies electric currents that are required for driving the first switch 230, and, the circuit board 210 outputs a signal corresponding to a user input, which is received through the first switch 230, to the controller 130.

The controller 130 detects a signal corresponding to the user input, which is inputted through the first switch 230 of the local key module 200, and, then, the controller 130 may execute the function of the display device 100, which is mapped to the detected signal.

The button unit 232 of the first switch 230 may be positioned along the same line (or aligned along the same direction) as the wheel key 220. More specifically, the button unit 232 of the first switch 230 may be positioned along the same line as the ring unit 221 of the wheel key 220.

The wheel key 220 may be configured to be titled along a direction being perpendicular to the rotation axis 222. For example, the wheel key 220 may have a tension allowing the wheel key 220 to be titled along a direction perpendicular to the rotation axis 222. Although the first switch 230 and the wheel key 220 are spaced apart from one another, according to the user's manipulation, the wheel key 220 may be titled, so that the first switch 230 and the wheel key 220 can come into contact with one another. This will be described in more detail later on with reference to FIG. 4.

According to the exemplary embodiment of the present invention, the local key module 200 may further include a bracket 260, which is positioned in a surrounding area of the wheel key 220. The bracket 260 may be positioned to envelop a portion of the wheel key 220.

Additionally, the local key module 200 may further include a second switch 240 and a third switch 250, which are positioned on the circuit board 210 so as to contact with the circuit board 210. For example, the second switch 240 and the third switch are electrically connected to the circuit board 210 respectively. The second switch 240 may be positioned to face into a portion of the bracket 260, and the third switch 250 may be positioned to face into another portion of the bracket 260.

The wheel key 220 may be configured to be tilted forward and backward. More specifically, the wheel key 220 may have one side titled to a direction approaching the circuit board 210 while having another side titled to a direction moving further away from the circuit board 210. In accordance with the tilting of the wheel key 220, the bracket 260 enveloping the wheel key 220 may also be tilted along with the wheel key 220. Although the bracket 260 and the second key 240 and the bracket 260 and the third key 250 are respectively spaced apart from one another, according to the user's manipulation, the wheel key 220 may be titled, so that the bracket 260 and the second key 240 can come into contact with one another, and also so that the bracket 260 and the third key 250 can come into contact with one another. This will be described in more detail later on with reference to FIG. 5.

The second switch 240 may be configured to include a body 241, which comes in contact with the circuit board 210, and a button unit 242, which is positioned on one surface of the body 241. Similarly, the third switch 250 may be configured to include a body 251, which comes in contact with the circuit board 210, and a button unit 252, which is positioned on one surface of the body 251. For example, each of the second switch 240 and the third switch 250 may correspond to a tact switch, which is configured to have each of the button units 242 and 252 protrude from one surface of the respective body 241 and 251.

The circuit board 210 supplies electric currents that are required for driving the second switch 240 and the third switch 250, and, the circuit board 210 outputs signals corresponding to users input, which are respectively received through the second switch 240 and the third switch 250, to the controller 130.

The controller 130 detects signals corresponding to each of the user inputs, which are respectively inputted through the second switch 240 and the third switch 250 of the local key module 200, and, then, the controller 130 may execute the function of the display device 100, which is mapped to the detected signals.

The second switch 240 and the third switch 250 may be positioned on the circuit board 210 along a same left-to-right (or horizontal) line or along a same up-and-down (or vertical) line, or the second switch 240 and the third switch 250 may be positioned on the circuit board 210 along a same diagonal line.

According to the exemplary embodiment, the bracket 260 may have a first protrusion 261 configured to protrude downward from the bracket 260 and a second protrusion 262 configured to protrude upward from the bracket 260. The first protrusion 261 may be configured to face into the button unit 242 of the second switch 240, and the second protrusion 262 may be configured to face into the button unit 252 of the third switch 250.

Referring to (a) of FIG. 3, in order to allow a contact point of the button unit 242 provided in the second switch 240 to be pressed more easily, the first protrusion 261 may have a sub-protrusion 261a formed on the portion of the first protrusion 261 facing into the respective button unit 242. Similarly, referring to (b) of FIG. 3, in order to allow a contact point of the button unit 252 provided in the third switch 250 to be pressed more easily, the second protrusion 262 may have a sub-protrusion 262a formed on the portion of the second protrusion 262 facing into the respective button unit 252.

Hereinafter, operations of the local key module 200 will be described in detail with reference to FIG. 4 to FIG. 6.

Figure 4:
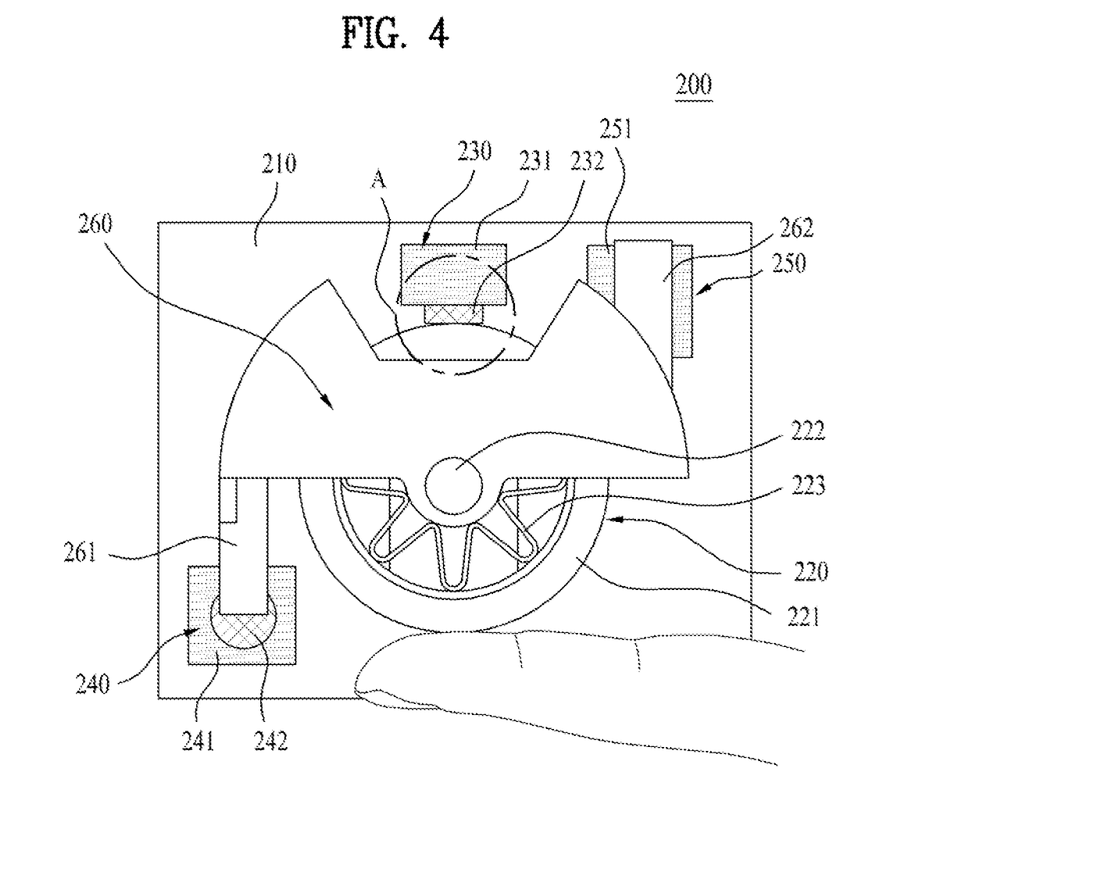
FIG. 4 illustrates a front view of a local key module according to an exemplary embodiment of the present invention.

FIG. 4 illustrates a front view of a local key module according to an exemplary embodiment of the present invention. FIG. 5 illustrates a left side view and a right side view of a local key module according to an exemplary embodiment of the present invention. And, FIG. 6 illustrates an exemplary table mapping user input, which is received through the local key module of the present invention, to functions of the display device and being stored in a memory.

The wheel key 220 of the local key module 200 and operations of the first switch 230 will hereinafter be described in detail with reference to FIG. 4.

The user may rotate the wheel key 220 (and, more specifically, the ring unit 221 of the wheel key 220) clockwise or counter-clockwise by using his (or her) finger. The rotation detection unit 270 may detect whether or not the wheel key 220 is being rotated, a rotating direction of the wheel key 220, and a rotation degree of the wheel key 220.

The controller 130 detects a signal corresponding to a rotation input of the wheel key 220 included in the local key module 200, and, then, the controller 130 performs a function of the display device 100 corresponding to the detected signal.

Figure 6:
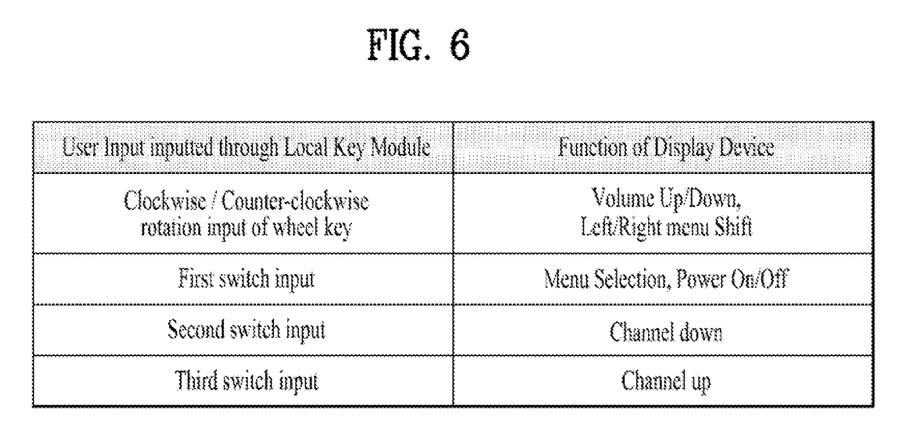
FIG. 6 illustrates an exemplary table mapping user input, which is received through the local key module of the present invention, to functions of the display device and being stored in a memory.

For example, referring to the table stored in the memory 140, as shown in FIG. 6, it can be known that a rotation input of turning (or rotating) the wheel key 220 clockwise or counter-clockwise corresponds to a volume up/down function (i.e., a function of turning the volume up or down) or a left/right menu shift function (i.e., a function of shifting menu options from left to right, or vice versa).

In case a function that is currently being executed in the display device 100 is requesting menu selection, the controller 130 may execute the left/right menu shift function in accordance with the detected signal. And, in case a function that is currently being executed in the display device 100 corresponds to audio data output, the controller 130 may execute the volume up/down function in accordance with the detected signal. More specifically, in case a rotation input of the wheel key 220 is detected, the controller 130 may detect the function that is currently being executed in the display device 100 or a display screen that is currently being displayed on the display unit 150, and, then, the controller 130 may differently set up a function corresponding to the rotation input based upon the detected function or display screen.

According to the present invention, since the clockwise rotation or counter-clockwise rotation of the wheel key 220 may be intuitively associated with the volume up/down function or the left/right menu shift function, user convenience is emphasized.

Alternatively, according to the exemplary embodiment, depending upon a rotation speed of the wheel key 220, even though the same clockwise rotation or counter-clockwise rotation of the wheel key 220 is inputted, different functions may be executed. For example, when the wheel key 220 is turned (or rotated) clockwise or counter-clockwise at a speed equal to or greater than a predetermined rotation speed, the controller 130 may execute the volume up/down function in accordance with the rotation input of the wheel key 220. And, when the wheel key 220 is turned (or rotated) clockwise or counter-clockwise at a speed less than the predetermined rotation speed, the controller 130 may execute the left/right menu shift function in accordance with the rotation input of the wheel key 220.

Additionally, the user may lift the wheel key 220 (and, more specifically, the ring unit 221 of the wheel key 220) upward by using his (or her) finger. Accordingly, as the wheel key 220 is tilted upward to be perpendicular to the driving axis (or rotation axis) 222, that is, the wheel key 220 is configured to be tilt in a direction away from the first plane, the first switch 230 may touch (or come in contact with) the ring unit 221 of the wheel key 220. If the user releases his (or her) finger from the wheel key 220, the tilted wheel key 220 returns to its initial position. In other words, as the button unit 232 of the first switch 230 is pressed due to the tilting of the wheel key 220 and then returns to its initial position, the respective user input may be received through the first switch 230.

The controller 130 detects a signal corresponding to a user input inputted through the first switch 230 included in the local key module 200, and, then, the controller 130 performs a function of the display device 100 corresponding to the detected signal.

For example, referring to the table stored in the memory 140, as shown in FIG. 6, it can be known that a user input inputted through the first switch 230 corresponds to a menu selection function or a power on/off function. More specifically, the display device 100 may be configured so that, if the user input inputted through the first switch 230 is received within a predetermined time period, the user input can correspond to the menu selection function, and that, if the user input inputted through the first switch 230 is continuously received for more than the predetermined time period, the user input can correspond to the power on/off function.

The controller 130 may also execute different functions (e.g., menu selection function or power on/off function) depending upon a duration time of the detected signal.

According to the present invention, since the motion of lifting the wheel key 220 upward may be intuitively associated with the menu selection function or the power on/off function, user convenience is emphasized.

Alternatively, according to the exemplary embodiment, the controller may also execute different functions depending upon a number of times a signal is detected within a predetermined time period through the first switch 230. For example, in case the signal inputted through the first switch 230 is detected two times (or twice) within a time period of one second, the controller 130 may execute the menu selection function. And, in case the signal inputted through the first switch 230 is detected three times within a time period of one second, the controller 130 may execute a function of verifying supplemental information or detailed information of the corresponding menu.

Meanwhile, operations of the wheel key 220, the second switch 240, and the third switch 250 of the local key module 200 will hereinafter be described in detail with reference to FIG. 5.

Figure 5:
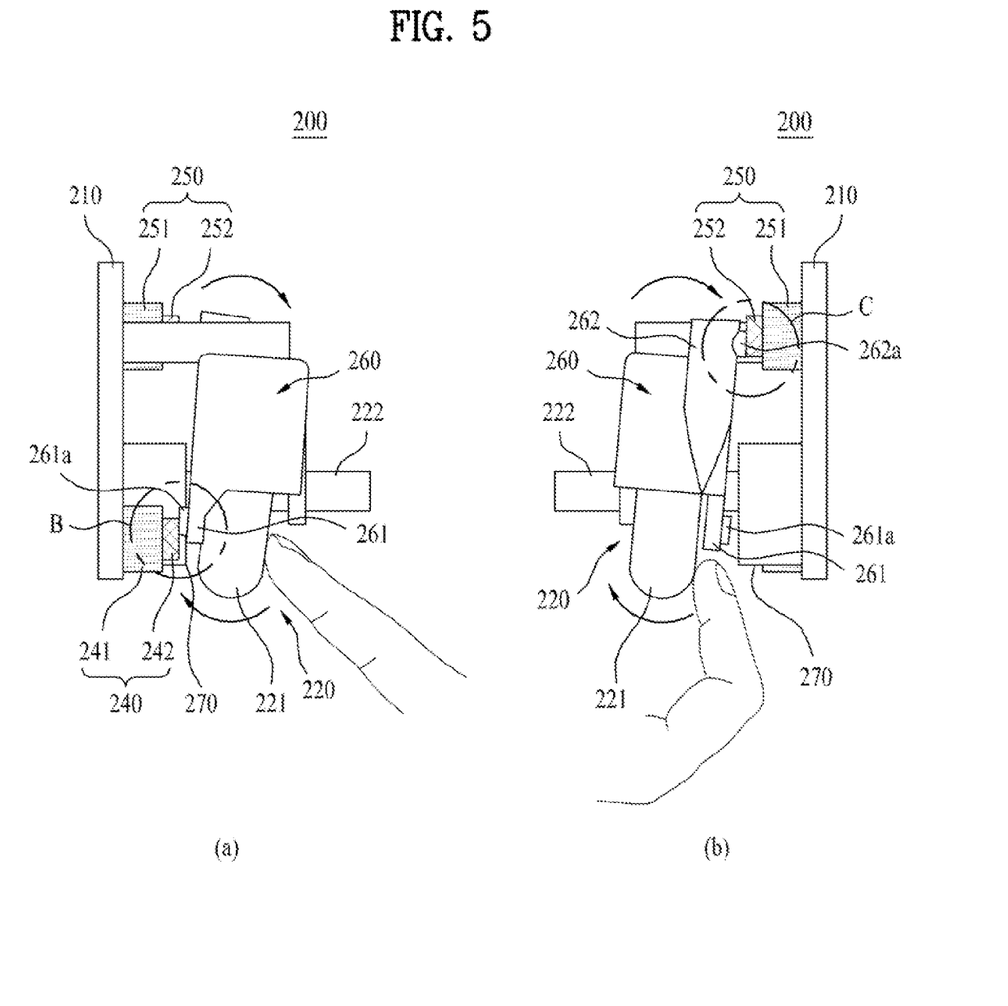
FIG. 5 illustrates a left side view and a right side view of a local key module according to an exemplary embodiment of the present invention.

Referring to (a) of FIG. 5, the user may press (or push) the wheel key 220 (and, more specifically, the ring unit 221 of the wheel key 220) downward to come within close range with the circuit board 210 by using his (or her) finger. Accordingly, as a portion of the wheel key 220 being touched (or contacted) by the user's finger is tilted backward, the bracket 260 that is enveloping the wheel key 220 is also tilted backward, thereby allowing the bracket 260 to touch (or come in contact with) the second switch 240. More specifically, one side (or portion) of the wheel key 220 that is being touched by the user's finger may be tilted to a direction allowing the wheel key 220 to come within close range with the circuit board 210, and another side (or portion) of the wheel key 220 may be tilted to a direction moving further away from the circuit board 210. Thereafter, when the user releases his (or her) finger from the wheel key 220, the tilted wheel key 220 and the tilted bracket 260 both return to their initial positions. In other words, as the button unit 242 of the second switch 240 is pressed due to the tilting of the wheel key 220 and then returns to its initial position, the respective user input may be received through the second switch 240.

The controller 130 detects a signal corresponding to a user input inputted through the second switch 240 included in the local key module 200, and, then, the controller 130 performs a function of the display device 100 corresponding to the detected signal.

For example, referring to the table stored in the memory 140, as shown in FIG. 6, it can be known that a user input inputted through the second switch 240 corresponds to a channel down function. Depending upon whether or not the detected signal is prolonged, the controller 130 may execute the channel down function (e.g., switching from a currently tuned Channel number 6 to Channel number 5).

According to the present invention, since the motion of pushing the wheel key 220 backward may be intuitively associated with the channel down function, user convenience is emphasized.

Alternatively, referring to (b) of FIG. 5, the user may pull the wheel key 220 (and, more specifically, the ring unit 221 of the wheel key 220) forward to be pulled further away from the circuit board 210 by using his (or her) finger. Accordingly, as a portion of the wheel key 220 being touched (or contacted) by the user's finger is tilted forward, the bracket 260 that is enveloping the wheel key 220 is also tilted forward, thereby allowing the bracket 260 to touch (or come in contact with) the third switch 250. More specifically, one side (or portion) of the wheel key 220 that is being touched by the user's finger may be tilted to a direction moving further away from the circuit board 210, and another side (or portion) of the wheel key 220 may be tilted to direction allowing the wheel key 220 to come within close range with the circuit board 210. Thereafter, when the user releases his (or her) finger from the wheel key 220, the tilted wheel key 220 and the tilted bracket 260 both return to their initial positions. In other words, as the button unit 252 of the third switch 250 is pressed due to the tilting of the wheel key 220 and then returns to its initial position, the respective user input may be received through the third switch 250.

The controller 130 detects a signal corresponding to a user input inputted through the third switch 250 included in the local key module 200, and, then, the controller 130 performs a function of the display device 100 corresponding to the detected signal.

For example, referring to the table stored in the memory 140, as shown in FIG. 6, it can be known that a user input inputted through the third switch 250 corresponds to a channel up function. Depending upon whether or not the detected signal is prolonged, the controller 130 may execute the channel up function (e.g., switching from a currently tuned Channel number 6 to Channel number 7).

According to the present invention, since the motion of pulling the wheel key 220 forward may be intuitively associated with the channel up function, user convenience is emphasized.

According to the exemplary embodiment, the controller 130 may execute different functions depending upon a time period during which signals are continuously detected from each of the second switch 240 and the third switch 250 and/or depending upon a number of times a signal is detected within a predetermined time period through each of the second switch 240 and the third switch 250.

Hereinafter, a position of the local key module 200 within the display device will be described in detail with reference to FIG. 7 and FIG. 8.

Figure 7:
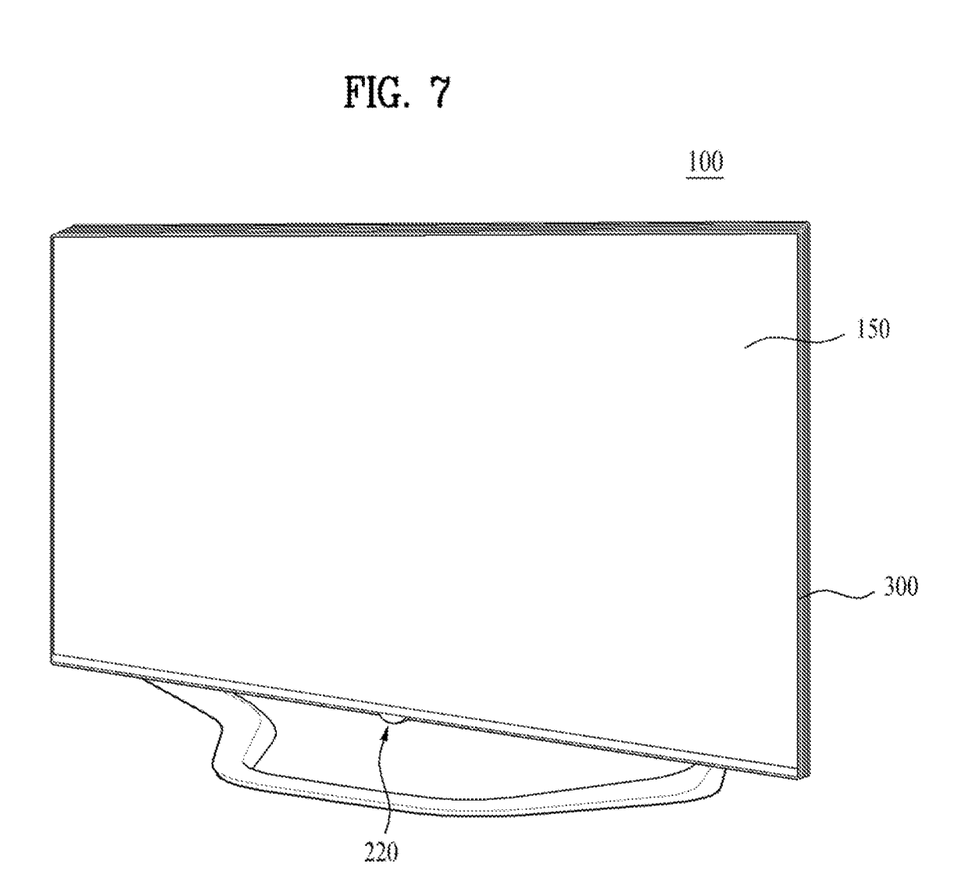
FIG. 7 illustrates outside features of a display device according to an exemplary embodiment of the present invention.

FIG. 7 illustrates outside features of a display device according to an exemplary embodiment of the present invention. And, FIG. 8 illustrates a cross-sectional view of a display device according to an exemplary embodiment of the present invention.

Figure 8:
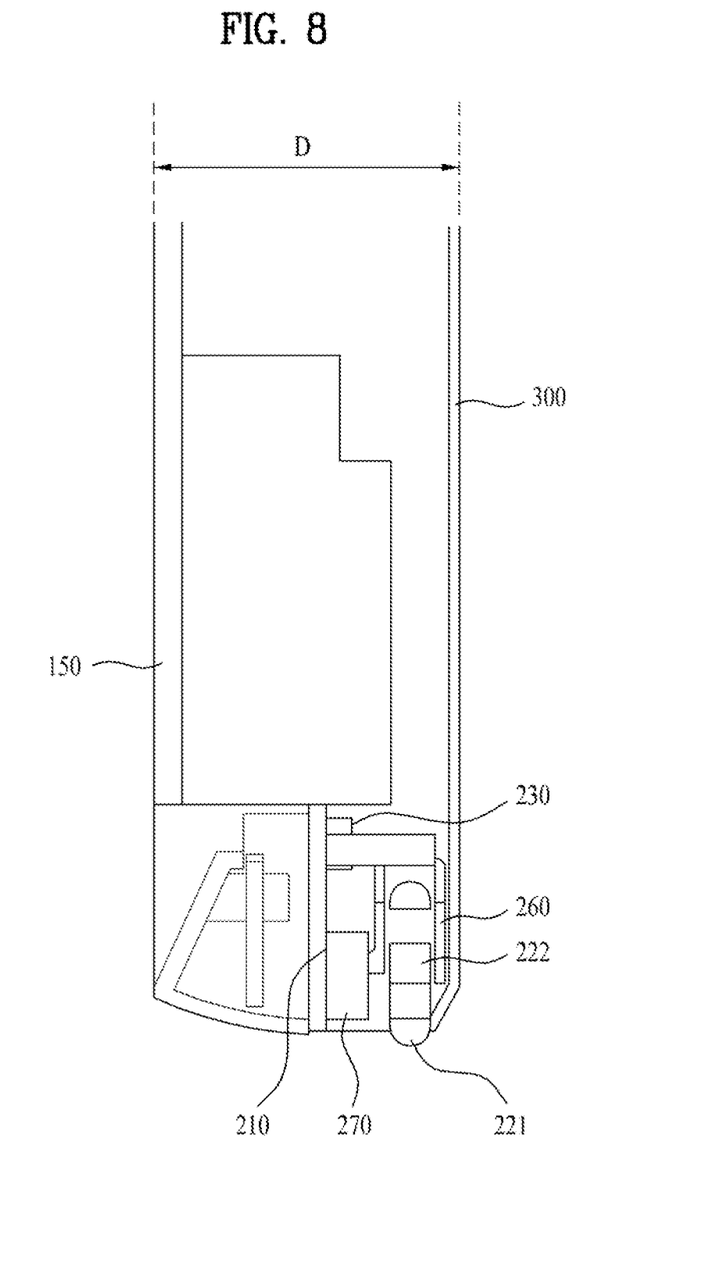
FIG. 8 illustrates a cross-sectional view of a display device according to an exemplary embodiment of the present invention.

Referring to FIG. 7 and FIG. 8, the display device 100 according to the exemplary embodiment of the present invention includes a display panel 150, a housing 300 configured to envelop side surfaces and a rear surface of the display panel 150, and a local key module 200 configured to be positioned at a lower inner portion of the housing 300. In the local key module 200, a portion of the wheel key 220 may be exposed to the outside of the housing 300. The user may perform a motion of pressing the first switch 230, a motion of pressing the second switch 240, and a motion of pressing the third switch 250 by manipulating the portion of the wheel key 220, which is exposed to the outside of the housing 300.

According to the exemplary embodiment, the wheel key 220 of the local key module 200 may be positioned at a portion lower than the display panel 150. The wheel key 220 may be parallel to the display panel 150.

Each of the display panel 150, the wheel key 220, and the circuit board 210 may aligned along the same direction. The related art display device was disadvantageous in that the circuit board of the local key module was positioned to be perpendicular to the display panel, thereby causing the overall thickness of the display device to become thicker due to the width (or thickness) of the circuit board. According to the present invention, by aligning the display panel 150, the wheel key 220, and the circuit board 210 along the same direction, the thickness of the local key module 200 becomes thinner, thereby allowing the overall thickness (W) of the display device to become slimmer.

As described above, the local key module and the display device including the same have the following advantages. According to the exemplary embodiment of the present invention, the thickness of the display device may be reduced by reducing the thickness of the local key module itself. Additionally, according to the exemplary embodiment of the present invention, provided herein is a solution allowing the user to intuitively control the functions of the display device by using the local key module.

The advantages of the present invention will not be limited only to the advantages described above. Accordingly, advantages that have not been mentioned above or additional advantages of the present application may become apparent to those having ordinary skill in the art from the description presented above.

Moreover, the configuration and method for configuring the above-described exemplary embodiments of the display device and the operating method of the same will not be limited only to the examples presented herein. And, therefore, it will be apparent that the exemplary embodiments of the present specification may be fully or partially modified and combined so as to implement a new exemplary embodiment of the present specification.

Additionally, although the preferred embodiments of presented herein, the present specification will not be limited only to the exemplary embodiments presented herein. And, therefore, it will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents, and that the varied embodiments should not be separately interpreted and understood from the technical scope and spirit of the present specification.

Finally, both device invention and method invention are described in the present specification. And, whenever required, the description of both inventions may be supplementarily applied.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A local key module for a display device, the local key module comprises:
    a wheel key having a circular shape aligned on a first plane, the wheel key including:
        a rotation axis positioned to be perpendicular to a circuit board;
        a ring unit to rotate with respect to the rotation axis, and to tilt with respect to the rotation axis in a backward tilting direction approaching the circuit board or in a forward tilting direction moving further away from the circuit board, respectively; and
        a spring unit positioned between the ring unit and the rotation axis, the spring unit to maintain tension between the ring unit and the rotation axis,
    a rotation detection unit configured to detect a rotating movement of the wheel key;
    a second switch to contact the wheel key based on the backward direction tilting of the wheel key;
    a third switch to contact the wheel key based on the forward direction tilting of the wheel key; and
    a circuit board configured to supply electric current to the rotation detection unit, the circuit board being aligned on a second plane, wherein the second plane is parallel is the first plane.

2. The local key module of claim 1, wherein the rotation detection unit is to couple to the rotation axis of the wheel key, and the rotation detection unit is to be provided on the circuit board.

3. The local key module of claim 1, further comprising:
    a first switch on the circuit board, the first switch to couple to the circuit board, and the first switch to be provided at an upper portion of the wheel key.

4. The local key module of claim 3, wherein the first switch includes a body to couple to the circuit board, and a button part at the body, and
    wherein the button part of the first switch is provided along a same line as the wheel key and at the first plane.

5. The local key module of claim 3, further comprising:
    a bracket provided at a surrounding area of the wheel key;
    the second switch on the circuit board, the second switch to couple to the circuit board, and the second switch to face a first portion of the bracket; and
    the third switch on the circuit board, the third switch to couple to the circuit board, and the third switch to face a second portion of the bracket.

6. The local key module of claim 5, wherein the second switch and the third switch are aligned along a diagonal line at the circuit board.

7. The local key module of claim 3, wherein in response to a user input, the wheel key is configured to tilt in a direction away from first plane.

8. The local key module of claim 7, wherein when the wheel key is tilted in a direction away from the first plane, the wheel key to contact the first switch.

9. The local key module of claim 7, wherein in response to a user input, the wheel key is configured to tilt to have a first portion within a close range of the circuit board and to have a second portion further away from the circuit board.

10. The local key module of claim 9, wherein when the first portion of the wheel key is within the close range, the wheel key to contact the second switch.

11. A display device comprising:
    a display panel having a first face to define a first plane;
    a housing provided at a side surface of the display panel and a rear surface of the display panel; and
    a local key module provided at a lower portion of the housing,
    wherein the local key module includes:
        a wheel key having a circular shape, the wheel key including:
            a rotation axis positioned to be perpendicular to a circuit board; and
            a ring unit to rotate with respect to the rotation axis, and to tilt with respect to the rotation axis in a backward direction approaching the circuit board or in a forward direction moving further away from the circuit board, respectively;
        a rotation detection unit configured to detect a rotating movement of the wheel key;
        a second switch to contact the wheel key based on the backward direction tilting of the wheel key;
        a third switch to contact the wheel key based on the forward direction tilting of the wheel key; and
        a circuit board configured to supply electric current to the rotation detection unit, wherein the wheel key to define a second plane, and the circuit board to define a third plane, and wherein the second plane is parallel to the first plane, and the third plane is parallel to the first plane,
    wherein a portion at the wheel key is exposed to outside of the housing in a downward direction.

12. A display device, comprising:
    a display;
    a local key module that includes:
        a wheel key having a circular shape, the wheel key including:
            a rotation axis positioned to be perpendicular to a circuit board; and
            a ring unit to rotate with respect to the rotation axis, and to tilt with respect to the rotation axis in a backward direction approaching the circuit board or in a forward direction moving further away from the circuit board, respectively,
        a rotation detection unit configured to detect a rotating movement of the wheel key;
        a circuit board configured to supply electric current to the rotation detection unit;
        a second switch to be contacted by the backward direction tilting of the wheel key; and
        a third switch to be contacted by the forward direction tilting of the wheel key;
        a controller configured to execute a predetermined function in accordance with a first signal based on the rotating movement of the wheel key detected by the rotation detection unit, wherein a portion at the wheel key is exposed to outside of the housing in a downward direction.

13. The display device of claim 12, wherein when the rotating movement of the wheel key is detected to be equal to or greater than a predetermined rotation speed, the controller to execute a first function in accordance with the first signal, and when the rotating movement of the wheel key is detected to be less than the predetermined rotation speed, the controller to execute a second function in accordance with the first signal, the second function being different from the first function.

14. The display device of claim 12, wherein when a signal based on a rotating movement of the wheel key is detected by the rotation detection unit, the controller to detect a display screen being currently displayed on the display and to execute a predetermined function in accordance with a signal based on the rotating movement of the wheel key and the detected display screen.

15. The display device of claim 12, wherein the local key module further includes a first switch, the first switch being on the circuit board, the first switch to couple to the circuit board, and the second switch to be provided at an upper portion of the wheel key, and wherein when the wheel key is tilted from an initial position, the wheel key to contact the first switch.

16. The display device of claim 15, wherein the controller to execute a predetermined function in accordance with a second signal, the second signal to be provided based on the wheel key contacting the first switch.

17. The display device of claim 16, wherein the controller to execute the predetermined function based on a time duration of the second signal and a total number of detections of the second signal.

* * * * *